United States Patent

[11] 3,600,946

| [72] | Inventors | Francis P. Ziemba<br>Granada Hills;<br>John R. Moross, Whittier; Henry S.<br>Katzenstein, Pacific Palisades, all of, Calif. |
|---|---|---|
| [21] | Appl. No. | 840,747 |
| [22] | Filed | July 10, 1969 |
| [45] | Patented | Aug. 24, 1971 |
| [73] | Assignee | Solid State Radiations, Inc.<br>Los Angeles, Calif. |

[54] LIQUID LEVEL SENSOR
10 Claims, 5 Drawing Figs.

| [52] | U.S. Cl. | 73/295,<br>340/244 |
|---|---|---|
| [51] | Int. Cl. | G01f 23/00 |
| [50] | Field of Search | 73/295;<br>340/244 |

[56] References Cited
UNITED STATES PATENTS

| 2,394,885 | 2/1946 | Baak | 73/295 |
| 2,965,888 | 12/1960 | Johnston | 73/295 X |
| 3,412,610 | 11/1968 | Prussin | 73/295 |
| 3,500,687 | 3/1970 | Smith | 73/295 |

*Primary Examiner*—S. Clement Swisher
*Attorney*—Jessup & Beecher

ABSTRACT: An improved liquid level sensor is provided which includes a first semiconductor element exhibiting particular resistance/temperature characteristics so as to have a first resistance value when the element is submerged in a liquid and a second resistance value when the liquid level drops to expose the element to the ambient temperature, and which includes a second element in series with the first element and exhibiting a positive resistance/temperature characteristic so as to render the sensor essentially independent of ambient temperature conditions.

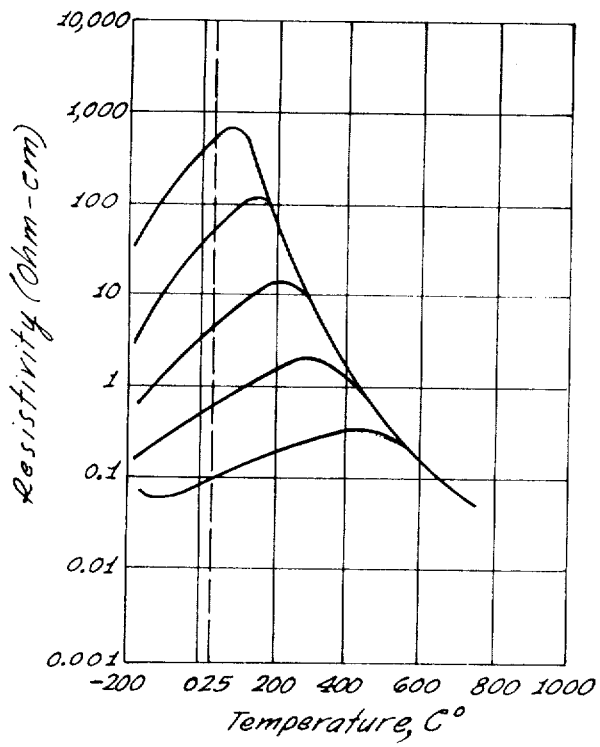
Fig. 1
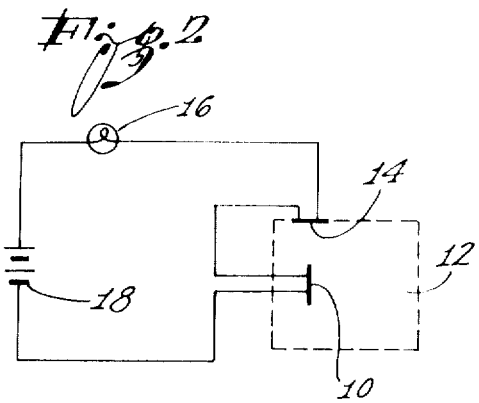
Fig. 2
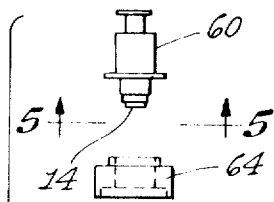
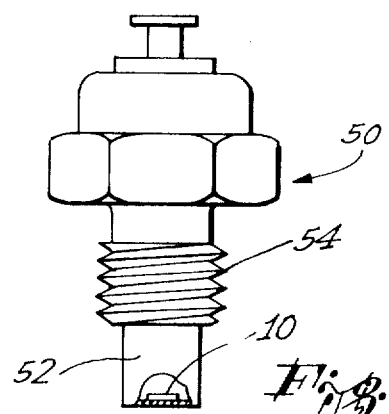
Fig. 3
Fig. 4
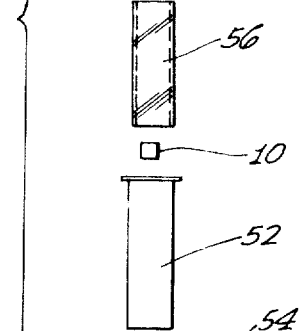
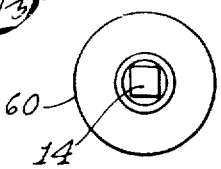
Fig. 5
INVENTORS:
Francis P. Ziemba
John R. Moross
Henry S. Katzenstein
ATTORNEYS

LIQUID LEVEL SENSOR

BACKGROUND OF THE INVENTION

Liquid level sensors which operate on the principle of the cooling effect of a liquid on a temperature sensitive resistor are known to the art. One form of such sensors utilizes a semiconductor element having a relatively large negative temperature coefficient of resistance, such as a thermistor. When so used, the thermistor is immersed or brought into contact with the fluid whose presence is to be sensed; and it is electrically connected into a circuit consisting of a source of potential, an external limiting resistor in series with the source and the thermistor, and an appropriate indicating device connected across the limiting resistor.

If no cooling fluid is in contact with the thermistor in the aforesaid prior art type of liquid level sensor, current from the source of potential flows through the external limiting resistor and through the thermistor, thereby producing a heating effect in the thermistor. This heating effect results in a temperature rise, and a corresponding drop in the resistance of the negative temperature coefficient thermistor, thus producing an increased current in the circuit and greater heating. The action is regenerative, and it stabilizes when the thermistor assumes a temperature sufficiently high so that a substantial portion of the voltage from the source appears across the external limiting resistor. The voltage across the limiting resistor can be used to initiate a control effect, such as to energize an electric lamp, indicating the absence of the cooling fluid in a contact with the thermistor.

In the presence of the cooling fluid whose presence is to be sensed, the temperature of the thermistor is limited to the temperature of the fluid, or slightly above the temperature of the fluid, so that the drastic reduction in its resistance due to the aforesaid regenerative heating effect does not take place. Therefore, only a limited portion of the voltage of the source appears across the external limiting resistor, so that the indicating device is not energized.

The prior art liquid level sensor systems using thermistors, as described above, are limited in their operating temperature range because, at very low ambient temperatures, the resistance of the thermistor is essentially infinite compared with the resistance of the external circuit. This means that negligible current flows through the thermistor at low ambient temperatures, regardless of whether or not it is in contact with the fluid. Therefore, no appreciable heating effect of the thermistor occurs under such conditions, even when the fluid level drops, and such heating effect is necessary to create the aforesaid regenerative action, and result in the energization of the indicating device. Likewise, at relatively high temperatures, the resistance of the thermistor may be sufficiently low, so that excessive current flows in the circuit, even when the thermistor is contacted by the fluid, so that the indicating device is energized when it should be deenergized.

In order to overcome the limitations of the thermistor type of liquid level sensor system, a device has been used in the prior art which uses a resistance element exhibiting a positive temperature coefficient of resistance below a critical temperature, and a negative temperature coefficient of resistance above the critical temperature. Such an element, for example, may be formed from relatively high resistivity semiconductor single crystal material, selected in a suitable resistivity range.

As compared with the thermistor element, which has only a negative temperature coefficient of resistance, the latter prior art semiconductor element is capable of operating satisfactorily over a much wider temperature range, for example, from 0°-250° F. This is because at low temperatures the positive temperature coefficient of resistance results in a relatively low resistance of the device, leading to the required heating effect, while at intermediate temperatures, the positive temperature coefficient of the element results in a reduction in the heating effect. That is, over the low part of the temperature range, the element is essentially degenerative in its action. The reduced heating effect at the intermediate temperatures reduces the difference in temperature between the element and the fluid to a value which provides for stable operation up to temperatures corresponding to the temperature at which the coefficient of resistivity of the element becomes negative.

The latter prior art device has broadened the temperature range, and the utility of the liquid sensor, as compared with the previous devices using the thermistor element. However, in many cases, the required range of temperature for satisfactory performance may be even greater than can be satisfactorily met by the latter prior art device, as described above. Particularly, for example, in automotive applications involving the detection of hydraulic fluids, lubricants, or coolants, sensor operating ranges in excess of 360° F. are encountered.

For example, if the vehicle is operated under Arctic conditions, temperatures of the order of −60° F. may be encountered, and under severe conditions of the use of such fluids, lubricants, or coolants, under tropic conditions, temperatures in excess of =300° F. may be encountered. Under such extreme conditions, the latter prior art liquid level sensor, either does not exhibit sufficient heating effect at the lower temperature extreme to assure the thermal regenerative action in the absence of fluid, or it exhibits heating effects at the high extreme temperatures which result in the thermal regenerative effect even in the presence of the fluid.

The thermal regenerative effect at the higher temperatures, even in the presence of the fluid, is particularly pronounced with fluids such as lubricating oils. This is because such oils have relatively high viscosity, even at high temperatures, and hence exhibit poor cooling characteristics due to the limitations in convection currents which are necessary to remove heat from the element, as is the case with the less viscous fluids.

Moreover, the temperature range for satisfactory operation of the latter prior art type of element is further limited by changes in the available voltage sources which in many automotive applications can range from 11–15 volts, for a rated 12-volt electrical system. It is apparent that the combination of low voltage and low temperature militates against the proper performance of the prior art sensor, as do high voltage and high temperature.

An important object of the present invention is to overcome the temperature and/or voltage limitations of the latter type of prior art sensor, and thus extend the range of ambient temperatures and voltages over which the sensor is effective. This is achieved in the embodiment to be described by the connection of a second semiconductor element in series with the aforesaid semiconductor element in the sensor. The second semiconductor element, however, is thermally isolated from the fluid, and is in intimate thermal contact with the body of the wall of the vessel containing the fluid.

The second semiconductor element is selected to have a positive temperature coefficient of resistance, as mentioned above, and may, for example, take the form of a resistor formed of usual metals such as nickel, platinum, copper or iron, all of which have a positive temperature coefficient of the order of 0.4 percent per degree Centigrade. Alternatively, the second semiconductor element may be of a semiconductor material having a sufficiently high doping level so that the normal negative temperature coefficient of resistance is not exhibited by the element throughout the entire range of ambient temperatures to be encountered by the sensor device. The latter materials typically have a positive temperature coefficient of the order of 1–2 percent per degree Centigrade and are more sensitive and therefore more desirable than the metals listed above for providing compensation over a wider range.

In one particular embodiment of the invention, as will be described, a first semiconductor wafer is provided in thermal contact with the fluid, and which has a resistivity of approximately 10 ohm-cm with a room temperature resistance of the order of 30 ohms. the second semiconductor wafer which is thermal contact with the wall of the vessel containing the fluid is made of 10 ohm-cm N-type silicon having a room temperature resistance of approximately 8 ohms. When such a sensor is used, for example, in a vehicle to indicate brake fluid level, it operates effectively from −50° Fahrenheit to +300° Fahrenheit and over a voltage range of 11.5 to 15.5 volts, when used in series, for example, with a General Electric "-Type 55" lamp bulb.

It will become evident as the description proceeds, however, that other combinations of materials, resistivities, and resistances may be fabricated in accordance with the principles of the invention to provide a sensor which is effective over extremely wide temperature and/or voltage ranges.

SUMMARY OF THE INVENTION

An improved liquid level sensor is provided using two semiconductor elements, one in thermal contact with the fluid to be detected, and the other in thermal contact with the wall of the vessel containing the fluid. The two elements are connected in series with one another, and with a source of potential and a current limiting resistor. A current responsive indicator may also be included in the series circuit, such as a light bulb or a relay coil. Or a voltage sensitive indicator may be connected, for example, across a limiting resistor. As also described, the semiconductor resistor in thermal contact with the wall of the vessel may be any resistance element having a positive temperature coefficient of resistance.

BRIEF DESCRIPTION OF THE DRAWING

FIG. 1 is a series of curves showing the relationship of resistivity versus temperature for various semiconductor materials;

FIG. 2 is a circuit diagram representing the liquid level sensor of the present invention and illustrating the manner in which it operates;

FIG. 3 is an elevation of one embodiment of a liquid level sensor incorporating the concepts of the present invention;

FIG. 4 is an exploded representation of the components which make up the sensor of FIG. 3; and fig. 5 is a bottom view of one of the components of FIG. 4, taken along the line 5—5 of FIG. 4.

DETAILED DESCRIPTION OF THE ILLUSTRATED EMBODIMENT

As mentioned above, FIG. 1 illustrates a family of curves for n-type conductivity semiconductor material, such as silicon. As shown by these curves, for temperatures below the peak resistivity value, the temperature coefficient of resistivity of the material is positive, and at temperatures above the peak resistivity value, the temperature coefficient of resistivity is negative. The shape of the resistivity versus temperature curves, including their peak resistivity values and the temperatures at which such peaks occur, depends upon the impurity doping of the material. Therefore, an appropriate semiconductor material may be selected which has a peak resistivity at a particular temperature suited for the application in which the liquid level sensor is to be used.

As shown in FIG. 2, an appropriate semiconductor element 10 is selected which has the characteristics shown in FIG. 1, and which exhibits its resistivity peak at a desired temperature. The element is placed in a vessel 12 in contact with fluid contained in the vessel, and is intended to detect when the level of the fluid drops so as to expose the element, and thereby create the desired regenerative effects described above. As also described, in order to exhibit the desired regenerative effects, the temperature must be such that with the particular applied voltage, the element is on the negative side of its characteristic curve of FIG. 1. This, as mentioned above, limits the application of such an element in the prior art sensors.

In the practice of the present invention, a second element 14 is mounted to be in thermal contact with the wall the the vessel 12, and the element 14 is selected to exhibit positive temperature/resistivity characteristics throughout the range of temperatures exhibited by the vessel 12. The two elements are connected in series with one another, and through a series connected indicating lamp to a source of potential indicated 18.

The element 14 operates effectively to increase the power applied to the element 10 at the lower temperatures, so that the element 10 will be driven towards its peak resistivity, in order to assure that it will be on the negative part of its temperature/resistivity curve should the fluid level drop in the vessel at the lower temperatures.

Conversely, the element 14 serves to reduce the power applied to the element 10 at the higher temperatures, due to the increased resistance of the element 14, so that the element 10 is drawn back towards the peak of its resistivity curve at the higher temperatures, so that it sill be operating in the positive characteristic range when contacted by the fluid at the higher temperatures.

An indicator 16 may take the form of an electric lamp, as mentioned, or a relay may be used to close any desired electrical alarm or control circuit, when the current through it exceeds a particular threshold.

As mentioned above, the sensor of the invention may take the form of the unit designated 50 in FIGS. 3 and 4. The unit 50 includes a cylindrical shaped hollow probe 52. The probe 52 is mounted in a housing 54. The probe has a closed lower end and an open upper and. The probe 52 may be composed of metal of relatively low heat conductivity, such as Kovar. The housing 54 may conveniently be formed of brass.

As shown in FIGS. 3 and 4, the semiconductor element 10 is welded, or otherwise mounted, on the inner surface of the closed end of the probe 52. Then when the sensor is mounted in the side of the vessel 12, for example, the probe is normally covered by the fluid in the vessel, and the element 10, which is in thermal contact with the probe, is also maintained at the temperature of the fluid. The probe 52 housing 54, which are in electrical contact with one another, form the ground electrical connection for the element 10.

An insulating sleeve 56 is inserted into the interior of the probe 52, and a spring 58 is inserted down into the sleeve to establish electrical contact with the other side of the semiconductor element 10. A subassembly 60, in the form of an electrical terminal member having the second semiconductor 14 welded, or otherwise affixed to its lower end, is supported in the housing 54, in an insulated relationship with the housing, and with the element 14 in electrical contact with the upper end of the spring 58.

A seal is provided by means of a washer 62 which prevents moisture from entering the interior of the assembly, and also assists in electrically insulating the terminal member of the subassembly 60 from the wall of the housing. An insulating bushing 64 supports the terminal member in the housing. The assembly is held together by bending the upper edge of the housing 54 around a peripheral flange on the subassembly 60.

The terminal member of the subassembly 60 is therefore electrically connected to one side of the semiconductor 14 which, in turn, is connected to the semiconductor 10 through the spring 58. The terminal member is connected to the ungrounded side of the source 18, through the indicator 16, to complete the circuit of FIG. 2. It will be appreciated that the element 10 is in thermal contact with the fluid in the vessel 12 through the probe 52, while the element 14 is in thermal coupled relationship with the wall of the vessel, through the wall of the housing 54, since it is adjacent the wall even though electrically insulated therefrom.

We claim:

1. Thermal sensing means for operating throughout a particular temperature range, including: a first element exhibiting a peak resistivity at a predetermined temperature within said particular temperature range and having a negative temperature coefficient of resistivity above said predetermined temperature and a positive temperature coefficient of resistivity below said predetermined temperature; a second element connected in series with said first element and exhibiting a positive temperature coefficient of resistivity within said particular temperature range; and current limiting means in series with said first and second elements.

2. The thermal sensing means defined in claim 1, in which said current limiting means comprises means indicating when the current in said circuit departs from a predetermined range.

3. The thermal sensing means defined in claim 1, in which said first element comprises a semiconductor silicon crystal of n— type having a resistivity of approximately 10 ohm-cm at a temperature of the order of 70° F.

4. The thermal sensing means defined in claim 1, in which said second element comprises a silicon semiconductor crystal exhibiting a resistance of the order of 8 ohms at a temperature of the order of 70° F.

5. A thermal fluid sensor for indicating the presence of a fluid within a vessel, and for operation throughout a predetermined temperature range, said sensor including: a first element positioned within said vessel for thermal contact with said fluid and exhibiting a peak resistivity at a predetermined temperature within said particular temperature range and having a negative temperature coefficient of resistivity above said predetermined temperature and a positive temperature coefficient of resistivity below said predetermined temperature; and a second element positioned to be in thermal contact with the wall of said vessel and series connected with said first element and exhibiting a positive temperature coefficient of resistivity in said particular temperature range and in which said first element and second element are comprised of semiconductor crystal wafers.

6. The thermal sensor defined in claim 5 and which includes a metallic housing adapted to be mounted in the wall of said vessel and a metallic probe extending from said housing into the interior of said vessel, and in which said first element is mounted in said probe and in thermal contact therewith, and said second element is mounted in said housing in thermal contact therewith.

7. The thermal sensor defined in claim 6 in which said probe and housing are electrically interconnected to form a common electrical connection to one side of said first element; and which includes an electrically conductive spring member electrically interconnecting one side of said second element to the other side of said first element.

8. The thermal sensor defined in claim 6 and which includes an electrical terminal member mounted in said housing and electrically insulating therefrom, said terminal member being electrically connected to the other side of said second element.

9. The thermal sensor defined in claim 5, in which said first element comprises a semiconductor silicon crystal of the n— type having a resistivity of approximately 10 ohms-cm. at a temperature of the order of 70° F.

10. The thermal sensor defined in claim 5, in which said second element comprises a silicon semiconductor crystal exhibiting a resistance of the order 8 ohms at a temperature of the order of 70° F.